United States Patent [19]

Nagaoka

[11] Patent Number: 5,377,423
[45] Date of Patent: Jan. 3, 1995

[54] SLUDGE DEHYDRATING PRESS AND METHOD FOR TREATING SLUDGE

[75] Inventor: Tadayoshi Nagaoka, Mihara, Japan

[73] Assignee: Nagaoka International Corporation, Japan

[21] Appl. No.: 115,193

[22] Filed: Aug. 31, 1993

[30] Foreign Application Priority Data

Sep. 11, 1992 [JP] Japan .................. 4-269250

[51] Int. Cl.⁶ .............................. F26B 19/00
[52] U.S. Cl. ............................ 34/70; 34/398; 34/400; 210/770; 210/609
[58] Field of Search ............. 34/388, 397, 398, 400, 34/69, 70, 143, 144, 146; 210/768–770, 609

[56] References Cited

U.S. PATENT DOCUMENTS

| | | | |
|---|---|---|---|
| 2,331,126 | 10/1943 | Loomis | 34/70 |
| 3,230,865 | 1/1966 | Hibbel et al. | 34/70 |
| 3,699,881 | 10/1972 | Levin et al. | 34/70 |
| 5,160,440 | 11/1992 | Mérai | 34/70 |

Primary Examiner—Denise L. Gromada
Attorney, Agent, or Firm—Hedman, Gibson & Costigan

[57] ABSTRACT

A sludge dehydrating press includes a container in which sludge to be treated is filled, a press unit for pressing sludge filled in the container, one or more screen cases disposed at positions in the container where water can be extracted from the sludge in substantially all portions of the sludge pressed by the press unit. Each of the screen cases has a screen surface extending parallel to the direction of pressing by the press unit and has also a space into which water extracted from the sludge flows. By driving the press unit, sludge in the container is compressed and extracted water is caused to flow into the space in the screen cases and is drained to the outside of the dehydrating press.

10 Claims, 6 Drawing Sheets

SLUDGE DEHYDRATING PRESS AND METHOD FOR TREATING SLUDGE

BACKGROUND OF THE INVENTION

This invention relates to a dehydrating press used for treating sludge such as sludge accumulated on the river bed, sludge in a sewage disposal plant and sludge removed in carrying out the shield driving method, particularly suitable for use for treating sludge accumulated on the river bed, and a method for treating sludge by using this dehydrating press.

Known in the art of dehydrating sludge is a method according to which sludge is dried in the sun. This method requires a large area of land and nowadays it is unrealistic to use this method in view of scarcity of land available for use for such purpose. A sludge dehydrating method currently used employs a chemical treatment of sludge prior to a dehydrating process. This method attempts to facilitate dehydration of sludge by treating sludge with a coagulant before dehydration.

Dehydration methods using a mechanical force are also used. One of these methods is a vacuum filtration which dehydrates sludge on a filtering cloth provided on the surface of a rotary drum by utilizing vacuum. A second method is a pressure filtration according to which sludge is pressed intermittently with a diaphragm in a filtering frame and then sludge is subjected to dehydration through a filtering cloth.

A third method is dehydration by a centrifugal separator. According to this mehtod, water is removed from sludge by utilizing difference in the specific gravity when the ceatrifugal separator rotated at a high speed.

A fourth method is dehydration by forming pellets. According to this method, sludge added with a high polymer coagulant and water glass is rotated in a slowly rotating drum and thereby sludge is formed into dehydrated pellets.

An ideal method for treating sludge is one which can dehydrate sludge containing a large ratio of water such as sludge accumulated on the river bed which is extremely difficult to be dehydrated and regenerate the dehydrated sludge as useful soil for land reclamation or gardening soil.

None of the above described prior art methods however has proved satisfactory from this standpoint.

The method utilizing vacuum filtration requires an apparatus of a large scale and this apparatus has not a large dehydration capacity. This method is alos disadvantageous in that clogging of the filtering cloth tends to occur in a relatively short period of time.

The method utilizing pressure filtration is superior in dehydrating capacity to the vaccum filtration. This method however is not exempt from the disadvantages that it requires an apparatus of a large scale and clogging of the filtering cloth tneds to occur in a short period of time.

The method using a centrifugal separator is not effective for dehydrating sludge on the river bed and besides the centrifugal separator is very expensive.

The method of forming sludge into pellets is a relatively simple method and disorders in the system seldom take place. The degree of dehydration attained by this method is not sufficiently high so that this method cannot be applied to all types of sludge including sludge on the river bed.

As described above, the prior art dehydration methods have various defects and a satisfactory dehydration method was not found for a long time. For this reason, in some cases sludge on the river bed is left on the river bed with a solidifying agent added therein. Unless a satisfactory dehydration method is developed for treating such type of sludge, the sludge treatment will become a serious environmental problem.

It is, therefore, an object of the present invention to provide a sludge dehydrating device and method which have eliminated the above described disadvantages of the prior art methods and can dehydrate sludge efficiently with a relatively simple structure and without causing the problem such as clogging of a filtering cloth.

SUMMARY OF THE INVENTION

In the process of repeated experiments carried out for solving the above described problem, the inventor of the present invent,ion has found that, by forming screen case of a circular or square cross section with a screen having a continuous slit such as a wedge wire screen and pressing sludge filled in this screen case with a hydraulic press, water is surprisingly extracted continuously from the slit of the screen case while dehydrated sludge remains in the screen case without flowing out of the slit.

Further experiments have revealed that while the dehydration by the screen case is effective in a case where a relatively small amount of sludge is filled in a relatively small screen case, when a relatively large amount of sludge is filled in the screen case, water which is smoothly extracted initially becomes increasingly difficult to be extracted as pressing of sludge continues until the amount of extracted water ceases to increase and instead the amount of sludge which leaks out of the packing of the piston head increases with the result that a sufficient dehydration effect cannot be obtained. An analysis of distribution of water containing rate in various parts of sludge in the screen case has proved that the water containing ratio of the sludge is lower in a portion near the screen of the screen case and higher in a portion remote from the screen. This signifies that the density of sludge near the screen increases as dehydration progresses to a further extent in this portion than in other portion as pressing of sludge continues with the result that extraction of water out of the slit of the screen is prevented by this high density portion of sludge so that sufficient dehydration of a portion remote from the screen is not made.

On the basis of this finding, the inventor of the present invention has considered that, rather than filling and pressing sludge filled in a screen case and thereby causing water to be extracted from inside of the screen to outside of the screen as originally intended, water can be extracted from all portions of sludge by adopting a structure of disposing a screen case in sludge filled in a container and causing water to be extracted into the inside of this screen case by pressing the sludge.

In this structure, if the container of sludge is large, a plurality of screen cases may be required for removing and collecting water from all areas of sludge. In this case, a pressing plate of a press may interfere with these screen cases and prevent their advance in the container. For preventing such interference, according to the invention, the surface of the screen in the screen case is disposed in parallel with the direction of pressing by press means.

The sludge dehydrating press achieving the object of the invention comprises a container in which sludge to be treated is filled, press means for pressing sludge filled in the container, one or more screen cases disposed at positions in the container where water can be extracted from the sludge in substantially all portions of the sludge pressed by the press means, each of said screen cases having a screen surface extending parallel to the direction of pressing by said press means and having also a space into which water extracted from the sludge flows.

According to the invention, by selectively disposing one or more screen cases having a space in which extracted water can flow at positions in the container where water can be extracted from the sludge in substantially all portions of the sludge, water is extracted by pressing from substantially all portions of the sludge and is caused to flow in the space of the screen cases and, after completion of pressing, sludge in the form of a cake which has sufficiently reduced water containing rate remains in the container.

Further, according to the invention, since the screen case is disposed in such a manner that the screen surface extends in parallel to the direction of pressing by the press means, the press section such as the press plate of the press means can move in parallel with the screen surface of the screen case whereby the press section can move into the container to a sufficient depth without being interfered by the screen case and thereby press the sludge to a sufficient degree.

As the container used in the dehydrating press of the present invention, a container of any desired shape such as a cylindrical or square tube container having a sludge inlet and sludge outlet may be used. The container may be made of a solid plate but a container which includes a screen in at least a part of the container can enhance the sludge dehydrating effect of the dehydrating press. Accordingly, it is one of features of the invention that the container in at least a part thereof has a screen surface. As the screen used for this purpose, a screen having a continuous slit such as a wedge wire screen is most preferable in that it has little clogging of the slit and the most excellent sludge dehydrating efficiency. Other type of screens such as those made of wire-mesh, synthetic fiber, perforated or slitted plate, filtering cloth reinforced by a reinforcing member, sintered metal and porous ceramic may also be used if such material has a function of excluding water from pressed sludge in the container.

It has been found as a result of the experiments that while the container having a screen surface in at least a part of the container has an improved sludge dehydrating efficiency as described above, by far a larger amount of water can be extracted from the screen cases which are provided in the container than an amount of water extracted, through the screen surface of the container.

The press means for pressing sludge includes a press section such as a pressing plate which contacts and presses sludge contained in the container and a known press section drive mechanism including a piston rod connected to this press section and drive means for reciprocally driving this piston rod.

The screen case disposed in the container may have any desired shape such as a square tube or a cylinder, or a tube of a triangular or pentagonal cross section.

As the screen of the screen case, a screen selected from screens such as a continuous slit screen and screens made of wire-mesh, synthetic fiber, porous plate, filtering cloth, sintered metal and porous ceramic of those screens reinforced by a reinforcing member on the inside of the screens may be used if the screen has a function of causing extracted water to flow into the space inside of the screen case. As a result of the experiments, however, it has been found that the most successful screen for the purpose of the invention, i.e., one having the least tendency to clogging and the largest dehydrating efficiency, is a wedge wire screen. The experiments have revealed also that, in the case of using a wedge wire screen, a better dehydrating effect can be obtained by disposing the screen in such a manner that the direction of the continuous slit becomes the same as the pressing direction, i.e., the direction in which pressing progresses than by disposing the screen in such a manner that the direction of the continuous slit crosses the pressing direction.

It has been found that in a case where a filtering cloth is used as the screen, clogging occurs at the initial stage of pressing of sludge but, as the pressure used in pressing increases, water starts to be extracted and a dehydrating effect to some extent can be obtained.

The screen case or cases are disposed at a position or positions where separation and collection of water from sludge can be made in all portions of the sludge contained in the container. This position is selected in consideration of various factors including the shape and size of the container and nature of sludge to be treated so that water can be extracted from sludge located at a point furthest from the screen surface. If the container is a large one and it is difficult to collect extracted water from the entire sludge with a single screen case, plural screen cases may be disposed to collect water from all portions of the sludge. It is an important feature and advantage of the present invention that extracted water can be collected from all portions of sludge to be treated by properly selecting the positions and number of screen cases in the container even in a case where the container is of a large capacity and contains a large amount of sludge to be treated.

The dehydrating effect can be improved by adding a proper known coagulant to sludge to be treated before starting pressing in the dehydrating press according to the invention. According to the invnetion, however, it is possible to dehydrate sludge sufficiently and form the dehydrated sludge into a cake even without using any coagulant. Since the addition of a coagulant to sludge to be treated before starting of a dehydrating process was indispensable in the prior art sludge dehydrating methods, the present invention provides a drastic improvement over the prior art methods in this respect.

In one aspect of the invention, the screen case is fixedly secured either to the container or the press means. It is more effective for improving the dehydrating efficiency to secure the screen cases both to the container and the press means.

In another aspect of the invention, the screen case is fixed to the container and the press means comprises a press section having an opening in which the screen case is fitted and being slidable along the screen case. In this aspect of the invention, the press section of the press means is slidable along the screen case and, therefore, the screen case can be designed to a sufficient length extending even to the entire length of the container. Accordingly, the area of the screen which is in contact with sludge can be made sufficiently large with resulting improvement in the dehydrating efficiency.

In anther aspect of the invention, the screen case can be inserted into and pulled out of the container and the press means comprises a press section having an opening in which said screen case is fitted and being slidable along the screen case which is inserted in the container. In this aspect of the invention, the area of the screen which is in contact with sludge can be made large in the same manner as in the above described aspect of the invention. Furthermore, in the sludge treating processing, when the screen case has been inserted after filling in of sludge in the container, sludge is compressed by the amount equivalent to the volume of the screen case and water corresponding to the compressed amount of sludge is caused to flow into the screen case and thus a primary dehydration is performed. Then, by the sliding movement of the press means along the screen case, a secondary dehydration is performed. By performing this double dehydrating processing, the dehydration efficiency can be improved.

In another aspect of the invention, the screen case can be inserted into and pulled out of the container, the container has an opening in which the screen case fitted and the press means presses the sludge and pushes the screen case in a direction in which the screen case is pushed out of the opening of the container. In this aspect of the invention also, the area of the screen which is in contact with sludge can be made large and, in the sludge treating processing, by inserting the screen case into the container after filling sludge in the container and pressing the sludge, a double dehydrating operation can be performed.

In another aspect of the invention, the screen case is fixed to the container in such a manner that the screen case divides the container in a plurality of chambers and the press comprises press sections of the same number as the number of the chambers, each of the press sections being caused to move inside of a corresponding one of the chambers along the screen case in pressing of the sludge by the press means. In this aspect of the invention, in a case where the container is of a large capacity and it is difficult to obtain a sufficient pressing force with a single press section, the necessary pressing force can be obtained by causing the plural pressing sections to move in the chambers divided by the screen case.

In still another aspect of the invention, the screen case is inserted in the container in such a manner that the screen divides the container in a plurality of chambers and the press comprises press sections of the same number as the number of the chambers, each of the press sections being caused to move inside of corresponding one of the chambers along the screen case in pressing of the sludge by the press means. In this aspect of the invention, by employing the plural press sections of the press means, a necessary pressing force which cannot be obtained by a single press section can be obtained and, besides, in the sludge treating processing, by inserting the screen case into the container after filling sludge in the container and then pressing sludge by the press means, a double dehyerating operation can be performed.

Preferred embodiments of the invention will be described below with reference to the accompanying drawings.

BRIEF DESCRIPTION OF THE DRAWINGS

In the accompanying drawings.

DESCRIPTION OF PREFERRED EMBODIMENTS

Figure 1:
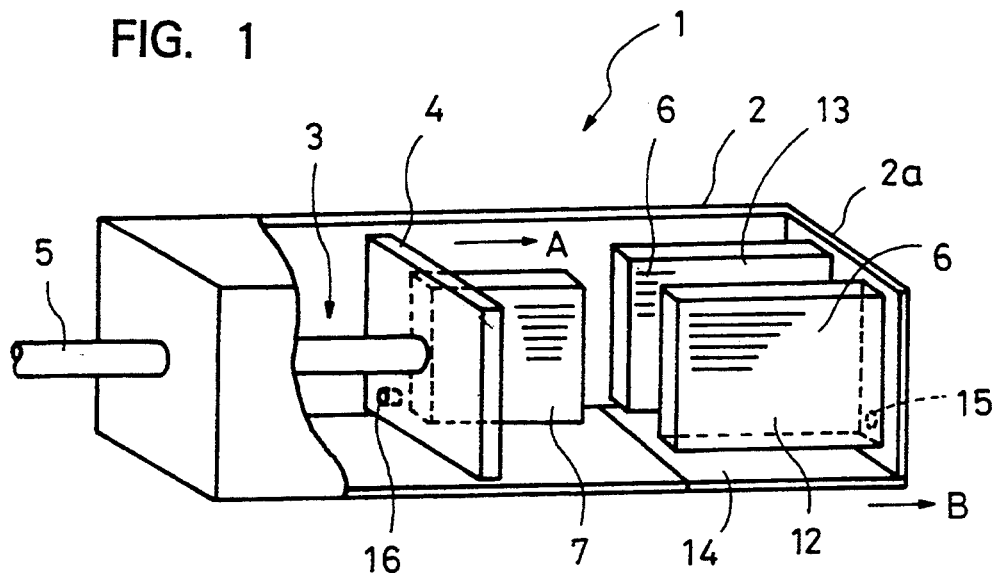
FIG. 1 is a perspective view showing an emDodiment of the dehydrating press according to the invention.
Figure 2:
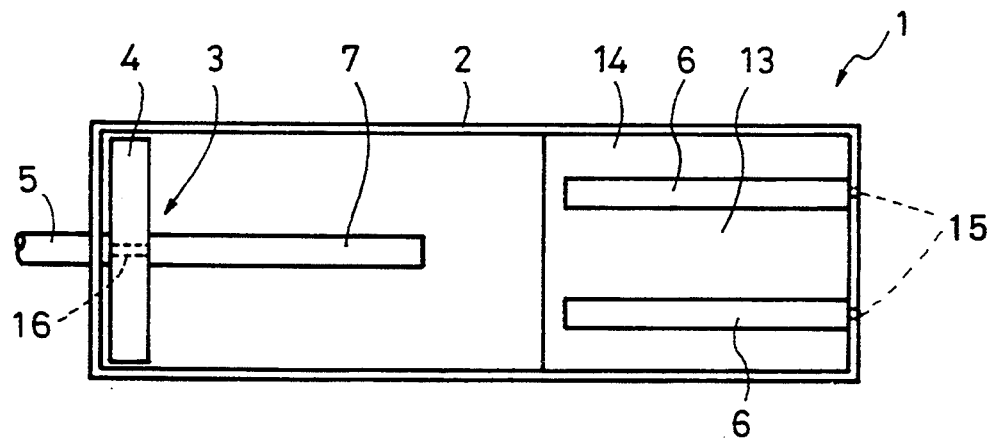
FIG. 2 is a plan view showing an operation state of the embodiment of FIG. 1.
Figure 3:
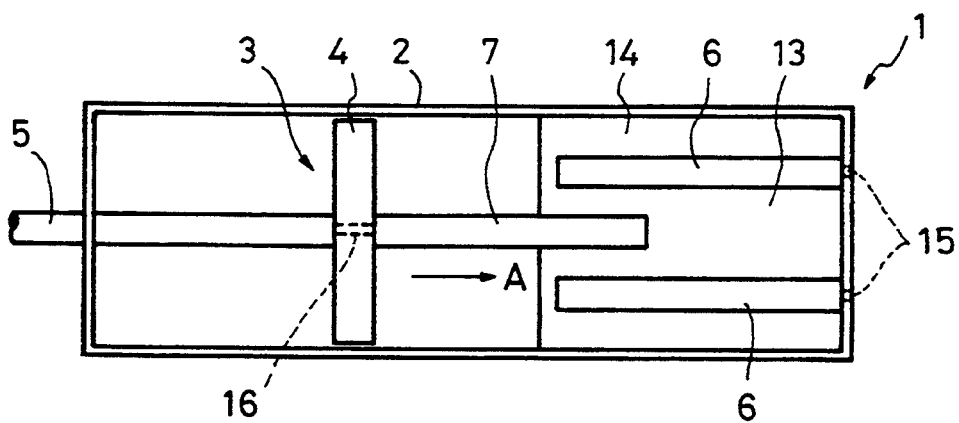
FIG. 3 is a plan view showing another operation state of the same embodiment.
Figure 4:
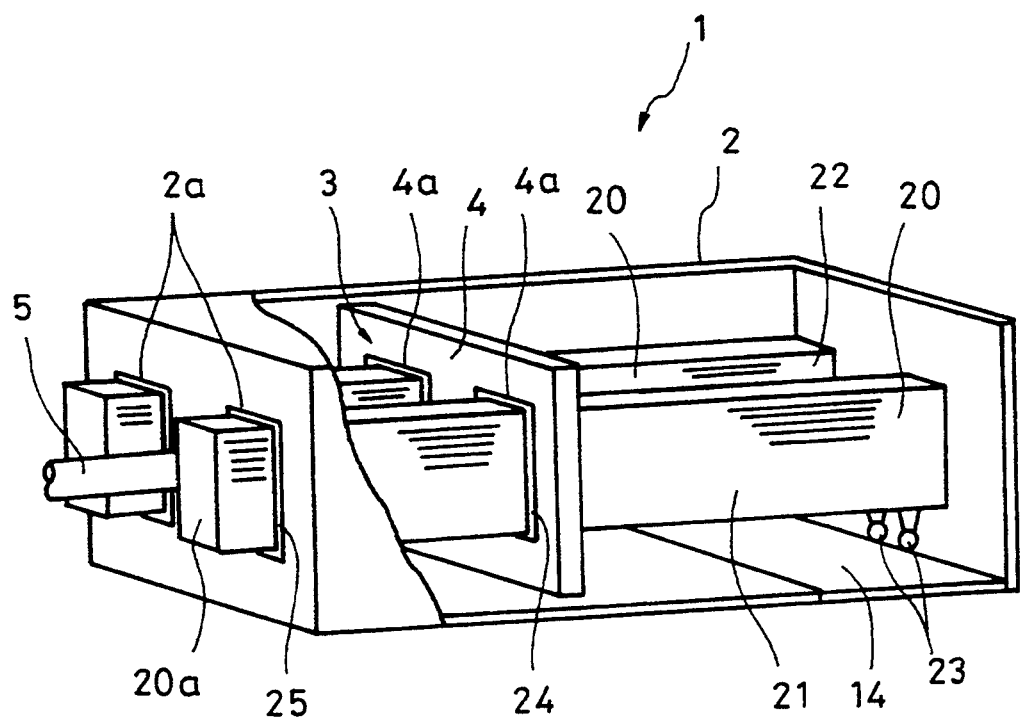
FIG. 4 is a perspective view showing another embodiment of invention.

FIGS. 1 to 3 show an embodiment of the invention in which FIG. 1 is a perspective view showing the press according to the invention removing a part of the container and FIGS. 2 and 3 are plan views showing this embodiment removing the top plate of the container.

A dehydrating press 1 includes a container 2 of a square tube shape in which sludge such as sludge accumulated on the river bed is filled and a hydraulic press 3 for pressing sludge filled in the container 1. The hydraulic press 3 constitutes the press means.

The container 2 is formed with solid plates and both the left and right ends thereof as viewed in FIG. 1 are closed.

The hydraulic press 3 includes a pressing plate 4 having a shape and size which enable it to be fitted in the container 2 and contacting and pressing sludge filled in the container 2, a piston rod 5 connected to the pressing plate 4 and a known drive means (not shown) for reciprocally driving this piston rod 5. The pressing plate 4 moves in the direction of arrow A in the figures and thereby compresses sludge filled in the container 2. That is, the direction of arrow A is the pressing direction.

To one end wall 2a of the container 2 are fixedly secured a couple of box-like screen cases 6, 5 with an interval 13 therebetween. To the pressing plate 4 of the hydraulic press 2 is also fixedly secured a box-like screen case 7. The screen case 7 is disposed at a position where the screen case 7 can move into the interval 13 between the screen cases 6, 6 when the pressing plate 4 moves in the container 2.

Figure 14:
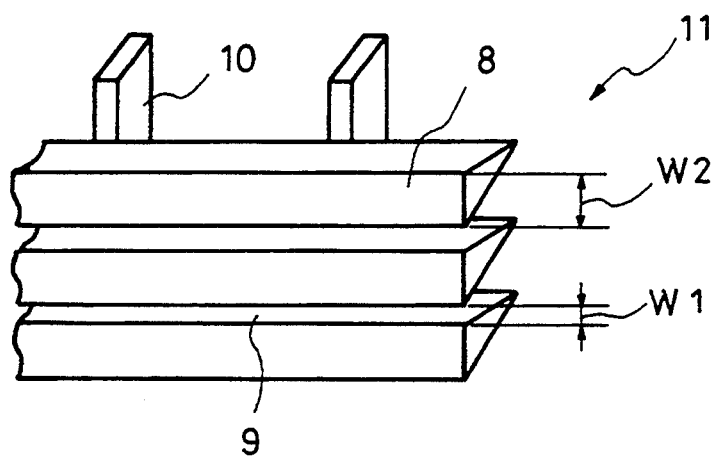
FIG. 14 is a partial perspective view showing an example of screen used in the embodiments of the invention.

Each of the screen cases 6 and 7 is closed with solid plates in their top and bottom surfaces and in their front and near end surfaces as viewed in the pressing direction. The sides of each screen case 6 or 7 extending in parallel to the pressing direction consist of wedge wire screens 11 which consist of wedge wires 8 and support rods 10 as shown in FIG. 14. By disposing the wedge wires 8 with their smooth surface facing outside of the screen case (i.e, facing the space in the container in which sludge is filled), the surface of the screen which contacts sludge is formed in a screen surface 12 which is smooth as a whole. The wedge wires 8 are also disposed in such a manner that the direction of extension of a slit 9 between the wedge wires 8 in the wedge wire screnn 11 becomes the same as the pressing direction A, (i.e., so that the slit 9 extends in the horizontal direction in FIG. 1). As will be apparent from FIG. 14, the wedge wire screen 11 is so formed that width W1 of the slit 9 is much smaller than width W2 of the wire 8. Having regard to the type of sludge, the degree of pre-treatment, pressing conditions and other conditions, the width of the slit 9 is determined to a maximum width within a range of width in which sludge does not flow out but extracted water only can flow out.

The distance between the screen surfaces 12 opposite to each other of the sides of the screen cases 6, 6 having the screen surfaces is determined in such a manner that water can be extracted at a point which is remotest from the screen surfaces. In this embodiment, the distance is determined at a proper value below 300 mm.

The screen surface 12 of each screen case 6 or 7 is formed in parallel to the pressing direction A and by this structure, the screen case 7 fixed to the pressing plate 4 can move into the interval 13 formed between the screen cases 6, 6 which are fixed to the container 2. According to this structure, the pressing plate 4 can move deeply into the container 2 to the extent that the screen case 7 moves in the interval 13 between the screen cases 6 and 6 whereby the pressing plate 4 can sufficiently compress and dehydrate the sludge filled in the container 2.

The lower portion of the forward end walls of the screen cases 6, 6 which are fixed to the container 2 and the corresponding end wall 2a of the container 2 are formed with outlets 15 for extracted water. Likewise, the lower portion of the screen case 7 affixed to the pressing plate 4 and the corresponding wall of the pressing plate 4 are formed with an outlet 16 for extracted water.

The top wall of the container 2 is formed with an unillustrated sludge supply inlet for supplying sludge from an unillustrated sludge supply device. There is provided an openable section 14 in the bottom plate of the container 2. The openable section 14 is slidable in the direction of arrow B by operating an unillustrated sliding mechanism so that the openable section 14 is opened to drop the dehydrated sludge into a sludge outlet provided below (not shown) when the dehydrating operation has been completed.

The operation of the above described dehydrating press will now be described.

A predetermined amount of sludge to be treated is filled in the container 2 in a state where the openable section 14 of the container 2 is closed and the pressing plate 4 is at the left end press start position as shown in FIG. 2. Then, as shown in FIG. 3, the pressing plate 4 of the hydraulic press 3 is moved in the direction of arrow A to compress the sludge in the container 2. The screen case 7 on the side of the pressing plate 4 moves into the interval 13 between the screen cases 6, 6 on the side of the container 2 and, when the screen case 7 has reached a position where it is substantially aligned with the screen cases 6, 6, the pressing of the sludge comes to an end. It is preferable that the pressing is made at a relatively low pressure initially and then is increased gradually. An optimum pressure applied and pressing time are determined having regard to conditions of dehydration including the type of sludge to be treated and the pre-treatment using coagulant.

As the pressing of the sludge by the hydraulic press 3 is advanced, water is extracted from the compressed sludge, flows into the screen cases 6 and 7 through the slits 9 of the screen surfaces 12 of these screen cases 6 and 7 and is excluded out of the container 2 through the outlets 15 and 15. Upon completion of pressing by the hydraulic press 3 and flowing out of the extracted water, the openable section 14 of the container 2 is opened to drop the dehydrated sludge into the sludge outlet below and the sludge dehydrating operation is now completed.

FIGS. 4 to 7 show another embodiment of the invention. In the embodiment of FIGS. 4 to 7 and subsequent embodiments, the same or similar components as those in the embodiment of FIGS. 1 to 3 will be designated by the same reference characters and description thereof will be omitted.

In this embodiment, two screen cases 20, 20 of a square tube shape have a length exceeding the length of the container 2. These screen cases 20, 20 are substantially of the same construction as the screen cases 6 and 7 used in the embodiment of FIGS. 1 to 3 except that the rear end of the screen cases 20 in the pressing direction is formed as an outlet 20a. Thus, the screen cases 20 have screen surfaces 21 consisting of wedge wire screens extending in parallel to the pressing direction., These screen cases 20, 20 are disposed in parallel to each other with an interval 22 therebetween. Each of these screens 20 has a pair of wheels 23 mounted at the forward end portion of the bottom plate as viewed in the pressing direction. The screen cases 20 are slidably fitted in openings 4a formed in a pressing plate 4 of a hydraulic press 3 through seal members 24 and also slidably fitted in openings 2a formed in the rear end portion of the container 2. The screen cases 20 therefore can move in and out of the container 2 in a direction parallel to the pressing direction.

The operation of this embodiment will now be described.

Figure 5:
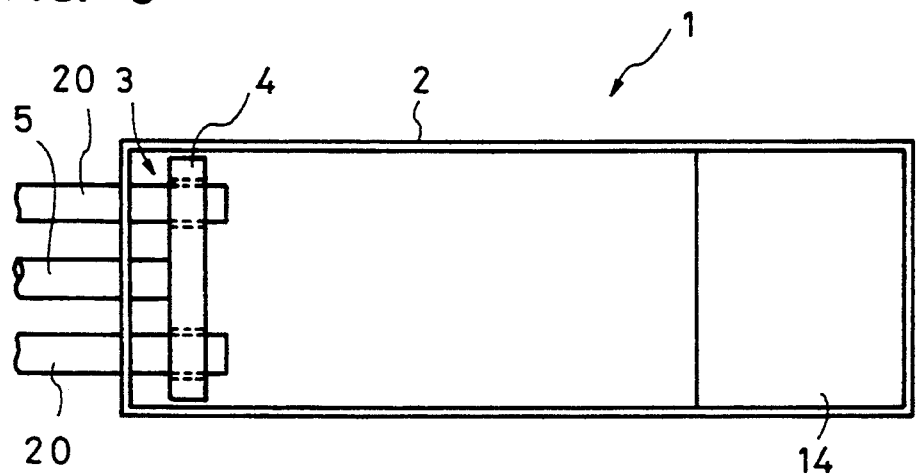
FIG. 5 is a plan view showing an operation state of the embodiment.

In a state before filling sludge to be treated in the container 2, as shown in FIG. 5, the pressing plate 4 and the screen cases 20, 20 are in a withdrawn position with a space of maximum volume being formed in the container 2. In this state, sludge is filled in the space of the container 2 in front of the pressing plate 4.

Figure 6:
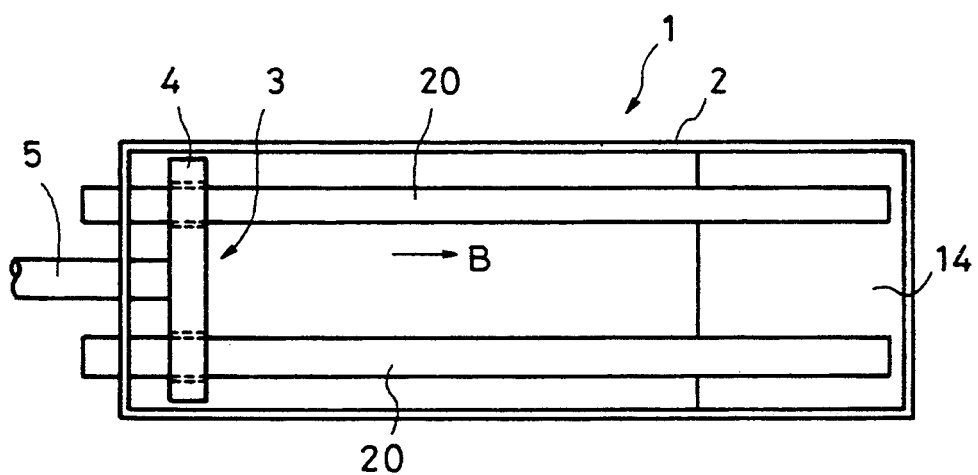
FIG. 6 is a plan view showing another operation state of the same embodiment.

Then, as shown in FIG. 6, the screen cases 20 are pushed from rear side by an unillustrated pushing means to move the screen cases 20 in the container 2 in the direction of arrow B. By this operation, sludge in the amount corresponding to the volume of the two screen cases 20 is compressed and water corresponding to this compressed sludge is caused to flow into the screen cases 20 as extracted water and drained outwardly through the outlets 20a. Thus, a primary dehydration is performed.

Figure 7:
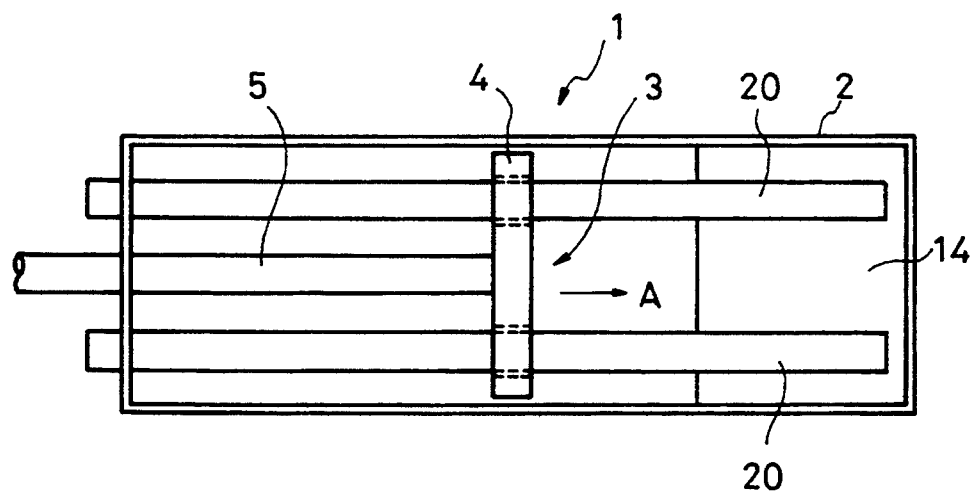
FIG. 7 is a plan view showing another operation state of the embodiment.

After completion of the primary dehydration, as shown in FIG. 7, the pressing plate 4 is caused to slide in the direction of arrow A in the container 2 by driving the hydraulic press 3 whereby the sludge in the container 2 is further compressed. Water extracted from the compressed sludge flows into the screen cases 20 and is drained from the outlets 20a. Thus, by advancing of the pressing plate 4 by a predetermined stroke, a secondary dehydration is performed. The sludge which has been formed into a cake by the double dehydration operations is taken out by opening the openable section 14 of the container 2.

Figure 8:
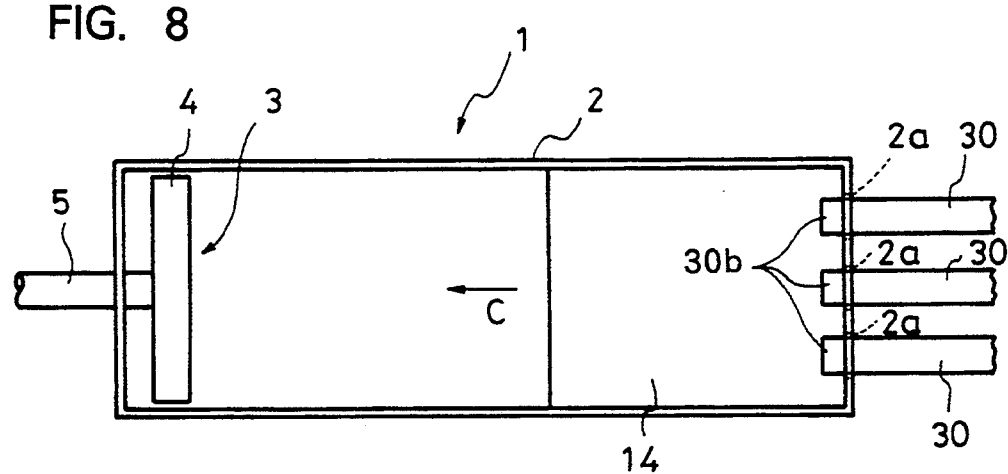
FIG. 8 is a plan view showing an operation state of another embodiment of the invention.
Figure 9:
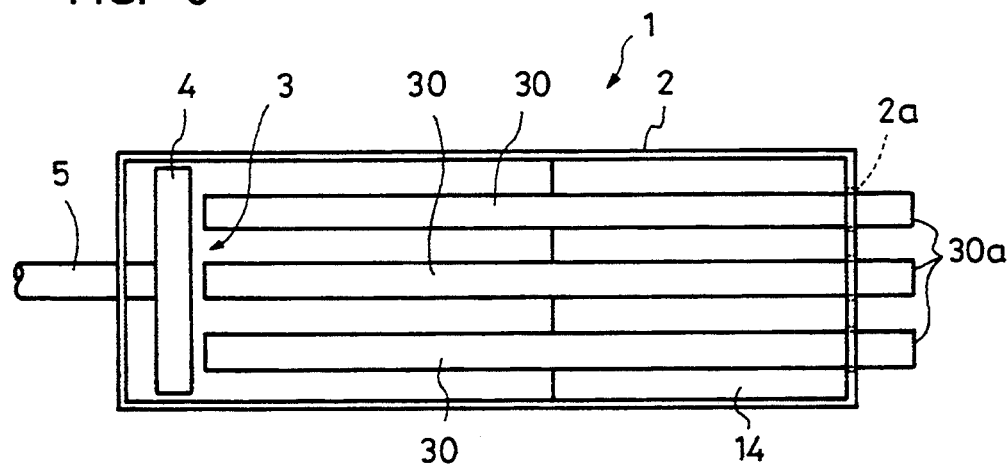
FIG. 9 is a plan view showing another operation state of the same embodiment.
Figure 10:
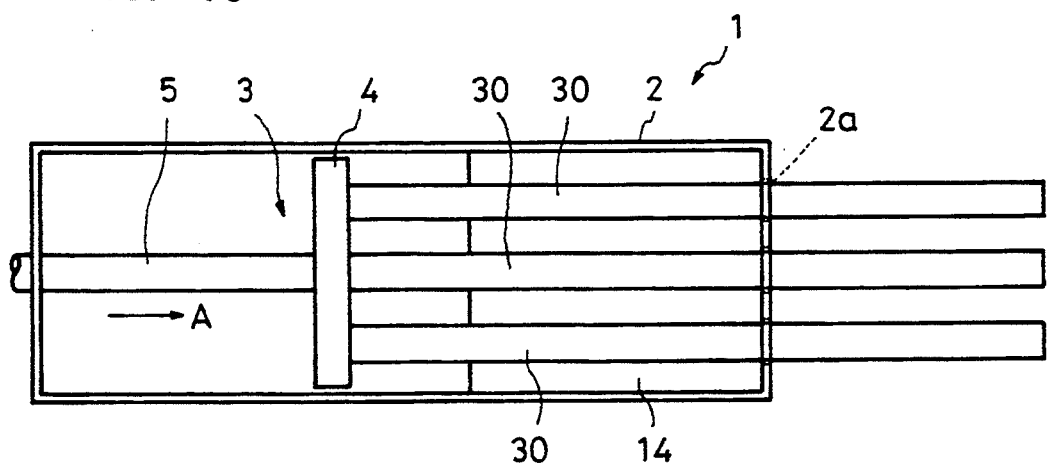
FIG. 10 is a plan view showing another operation operation of the same embodiment.

FIGS. 8 to 10 show another embodiment of the invention.

In this embodiment, three screen cases 30 of a square tube shape are of a similar construction as the screen cases 20 of the embodiment shown in FIGS. 4–7. These screen cases 30 are slidable in the container 2. These screen cases 30 are different from the screen cases 20 in that outlets 30a for extracted water are formed at the forward end portion of the screen cases 30 (see FIG. 9) and the rear end portion of the screen cases 30 is closed and that wheels (not shown) are mounted in the rear portion of the screen cases 30. The container 2 is different from the container of the embodiment of FIGS. 4–7 in that the container 2 is formed with an opening 2a in the forward end portion thereof and that an opening is not formed in the pressing plate 4.

The operation of this embodiment will be described.

In a state before filling sludge in the container 2, the pressing plate 4 and the screen cases 30 are at their withdrawn position shown in FIG. 8 and a maximum space is formed in the container 2. In this state, sludge is filled in the space in the container 2.

Then, as shown in FIG. 9, the screen cases 30 are pushed by an unillustrated pushing means to move them in the direction of arrow C in FIG. 8. By this moving of the screen cases 30, sludge in the container 2 corresponding to the volume of the screen cases 30 is compressed and water corresponding to the compressed volume is caused to flow into the screen cases 30 and is drained from the extracted water outlets 30a. Thus, a primary dehydration is performed.

After completion of the primary dehydration operaton by pushing the screen cases 30 to the rear end of the container 2 as shown in FIG. 9, the hydraulic press 3 is driven as shown in FIG. 10. The pressing plate 4 comes into abutting engagement with the rear end surfaces 30b of the screen cases 30 and slides in the direction of arrow A to compress the sludge further while pushing the screen cases 30. Water extracted from this further compressed sludge is caused to flow into the screen cases 30 and is drained from the outlets 30a. By the movement of the pressing plate 4 by a predetermined stroke, a secondary dehydration is performed. Upon completion of the dehydrating operation, the sludge formed into a cake is taken out of the container 2 by opening the openable section 14.

Figure 11:
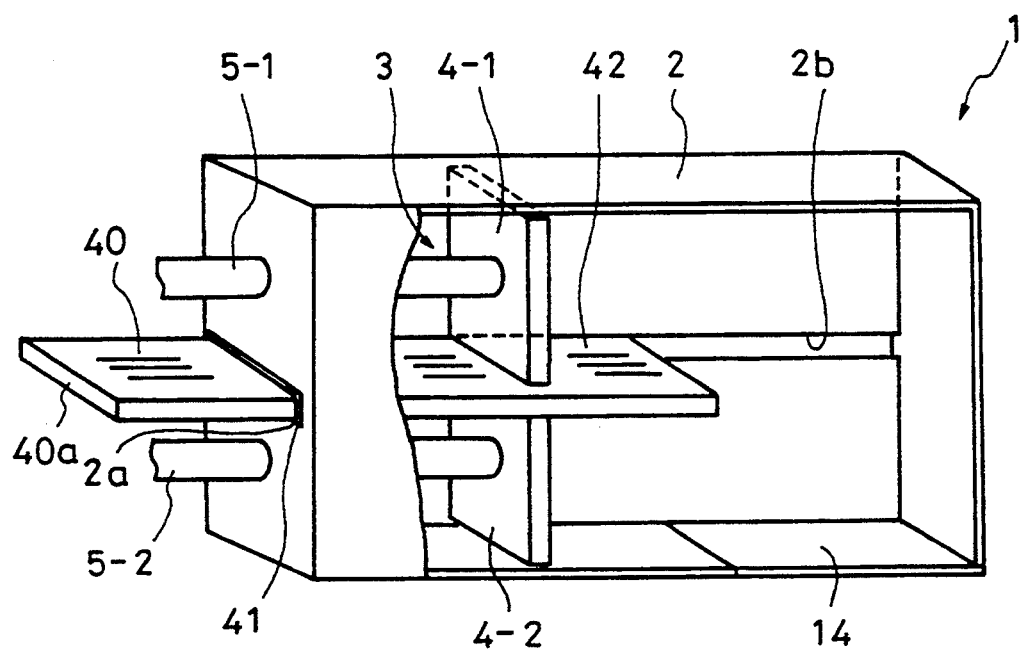
FIG. 11 is a perspective view showing another embodiment of the invention.
Figure 12:
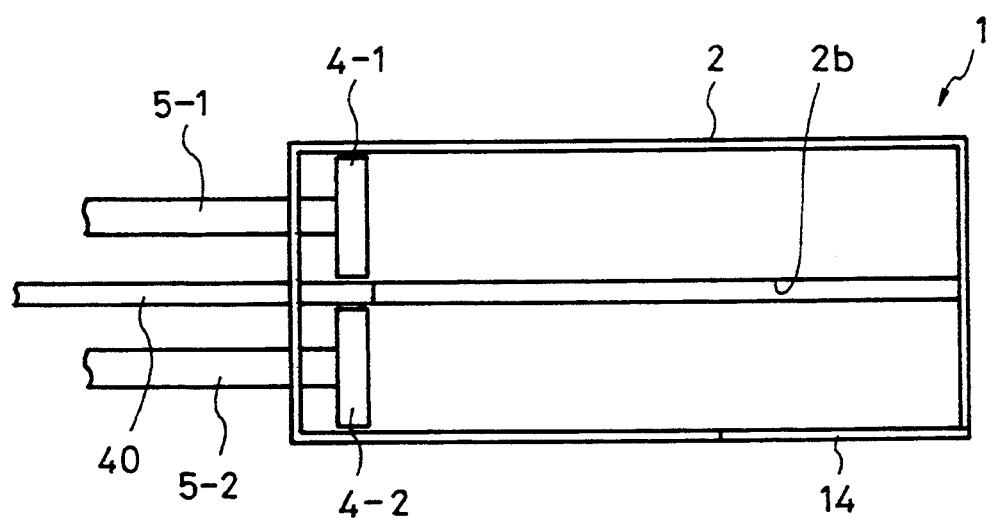
FIG. 12 is a side view showing an operation state of this embodiment.
Figure 13:
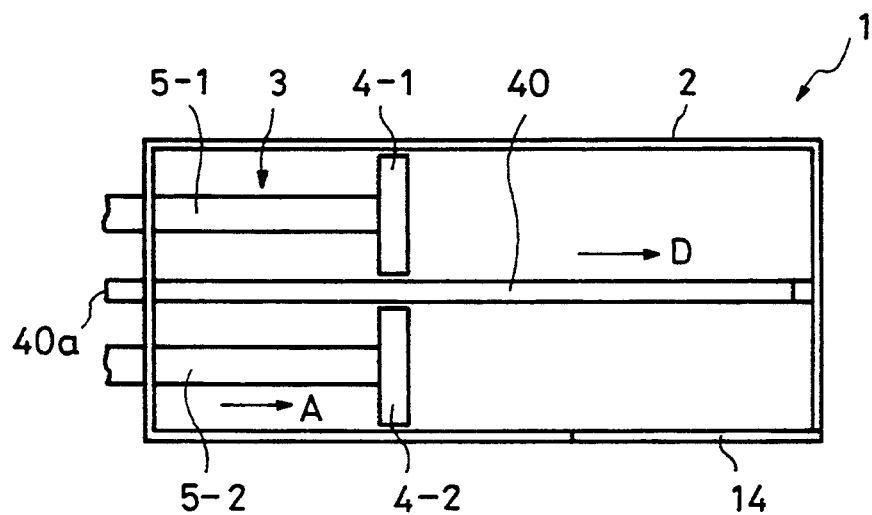
FIG. 13 is a side view showing another operation state of the embodiment.

FIGS. 11 to 13 show another embodiment of the invention.

In this embodiment, a screen case 40 is inserted into a container 2 in such a manner that the screen case 40 will divide the container 2 vertically into two chambers. The container 2 is formed in its rear end portion with an opening 2a for inserting the screen case 40 therethrough. A seal member 41 is mounted on the opening 2a. A pair of guide grooves 2b are formed on the inner sides of the side plates of the container 2 for guiding the sliding screen case 40.

The screen case 40 has a square tube shape having a length exceeding the length of the container 2. The upper and lower surfaces of the screen case 40 are formed with screen surfaces 42 consisting of wedge wire screens in the same manner as the above described embodiments. The other sides of the container 2 are closed except for an outlet 40a for extracted water provided at the rear end thereof. A pressing plate of the hydraulic press 3 is vertically divided into two pressing plates 4 - 1 and 4 - 2 and two pistons 5 - 1 and 5 - 2 so that they can slide in the chambers of the divided container 2. The pressing plates 4 - 1 and 4 - 2 are driven by two separate drive means to slide along the upper and lower surfaces of the screen case 40.

The operation of this embodiment will now be described.

In a state before filling sludge in the container 2, the pressing plates 4 - 1 and 4 - 2 and the screen case 40 are in a withdrawn position and a maximum space is formed in the container 2. In this state, sludge is filled in the space before the pressing plates 4 - 1 and 4 - 2 in the container.

Then, as shown in FIG. 13, the screen case 40 is pushed to move in the direction of arrow D in such a manner that it will divide the container 2 into the upper and lower chambers. Sludge in the amount corresponding to the volume of the screen case 40 is thereby compressed and water corresponding to the compressed sludge is caused to flow into the screen case 40 and is drained from the outlet 40a. Thus, a primary dehydrating operation is performed.

After completion of the primary dehydrating operation by pushing the screen case 40 to the front end of the container 2, as shown in FIG. 13, the hydraulic press 3 is driven to cause the pressing plates 4 - 1 and 4 - 2 to slide in the direction of arrow h in the upper and lower chambers of the container 2 along the screen case 40 to further compress the sludge. Water extracted from the compressed sludge by this compression is caused to flow into the screen case 40 and is drained from the outlet 40a. Thus, a secondary dehydrating operation is performed by the movement of the pressing plates 4 - 1 and 4 - 2 by a predetermined stroke. The dehydrated sludge formed into a cake is taken out of the container 2 by opening the openable section 14.

In the embodiments of FIGS. 4–7 and FIGS. 11–13, the screen cases can be inserted into and pulled out of the container. Alternatively, the screen cases may be fixedly secured to the container. In this latter structure, however, the above described primary dehydration effect by insertion of the screen case or cases can not be obtained.

In the above described embodiments, pressing is made only in one way. Pressing may however be made in plural directions as necessity arises.

In a case where the continuous slit screen is used as the screen, not only a wedge wire but also wires of other cross sections such as a circular, triangular, squre, pentagonal cross sections may be used. As the support rods also, a support rod of any cross section, e.g., circular, square, tiangular etc. may be used. As the continuous slit screen, not only a screen consisting of a combination of wires and rods but also a slitted plate may be used.

In a case where a container is divided in plural chambers by a dividing screen case as shown in FIGS. 11–13, the dividing screen case is not limited to one but plural dividing screen cases may also be employed.

The press means is not limited to a hydraulic press as described above but any press means may be used if it can compress sludge contained in a container in a state where a screen case or cases are disposed in the container.

In the above described embodiments, the container is used in a laid down posture but it may be used in an erected posture also.

What is claimed is:

1. A sludge dehydrating press comprising:
   a container in which sludge to be treated is filled;
   press means for pressing sludge filled in the container;
   one or more screen cases disposed at positions in the container where water can be extracted from the sludge in substantially all portions of the sludge pressed by the press means, each of said screen cases having a screen surface extending parallel to the direction of pressing by said press means and having also a space into which water extracted from the sludge flows.

2. A press as defined in claim 1 wherein said screen case is fixedly secured to either said container or said press means.

3. A press as defined in claim 2 wherein said screen case is fixed to said container and said press means comprises a press section having an opening in which said screen case is fitted and being slidable along said screen case.

4. A press as defined in claim 1 wherein said screen case can be inserted into and pulled out of said container and said press means comprises a press section having an opening in which said screen case is fitted and being slidable along said screen case which is inserted in said container.

5. A press as defined in claim 1 wherein said screen case can be inserted into and pulled out of said container, said container has an opening in which said screen case is fitted and said press means presses the sludge and pushes said screen case in a direction in which said screen case is pushed out of the opening of said container.

6. A press as defined in claim 1 wherein said screen case is fixed to said container in such a manner that said screen case divides said container into a plurality of chambers and said press means comprises press sections of the same number as the number of said chambers, each of the press sections being caused to move inside of a corresponding one of the chambers along said screen case in pressing of the sludge by said press means.

7. A press as defined in claim 1 wherein said screen case is inserted in said container in such a manner that said screen divides said container into a plurality of chambers and said press comprises press sections of the same number as the number of said chambers, each of said press sections being caused to move inside of a corresponding one of the chambers along said screen case in pressing of the sludge by said press means.

8. A press as defined in claim 1 wherein said container in at least a part thereof has a screen surface.

9. A method for treating sludge comprising steps of:
   filling sludge to be treated in the sludge dehydrating press as defined in claim 1; and
   dehydrating the sludge by pressing the sludge.

10. A method as defined in claim 9 comprising steps of:
    filling the sludge to be treated in the container of the sludge dehydrating press as defined in any of claim 4;
    inserting said screen case into said container; and
    dehydrating the sludge by pressing it by said press means.

* * * * *